United States Patent

Miller et al.

[15] 3,675,332

[45] July 11, 1972

[54] SPHERICAL MEASUREMENT DEVICE

[72] Inventors: Howard B. Miller, Hampton; George E. Sweet, Yorktown, both of Va.

[73] Assignee: The United States of America as represented by the Administrator of the National Aeronautics and Space Administration

[22] Filed: Feb. 12, 1970

[21] Appl. No.: 10,827

[52] U.S. Cl. .............................................. 33/1 SA, 33/75 R
[51] Int. Cl. ..................................................... G01b 5/24
[58] Field of Search ............ 33/1 R, 1 SA, 1 DD, 1 D, 174 D, 33/180 R, 215.2

[56] References Cited

UNITED STATES PATENTS 2,775,040  12/1956  Leff .................................... 33/174 D
3,047,957  8/1962  Conway ............................... 33/174 D
2,880,511  4/1959  Steinwachs ........................... 33/1 R

*Primary Examiner*—William D. Martin, Jr.
*Attorney*—Howard J. Osborn, Wallace J. Nelson and G. T. McCoy

[57] ABSTRACT

A measuring device having an elevational wheel mounted on an azimuth wheel with a spherical protractor supported by the elevation wheel in a manner such that a telescopic rod extending through the spherical protractor is capable of determining the distance of a point within a sphere from the surface of the sphere. In order to accomplish angular location of the inner surface a flat protractor can be adjustably mounted on the end of the measuring rod.

8 Claims, 6 Drawing Figures

PATENTED JUL 11 1972 3,675,332
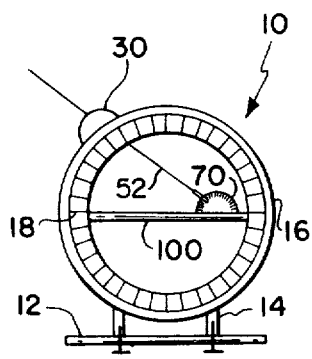
FIG. 1
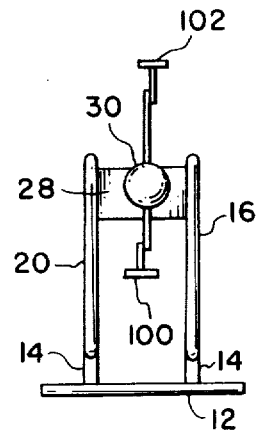
FIG. 2
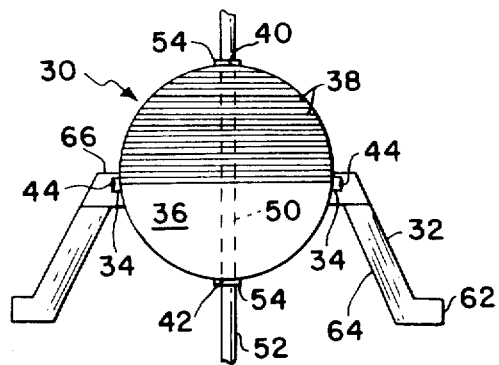
FIG. 3
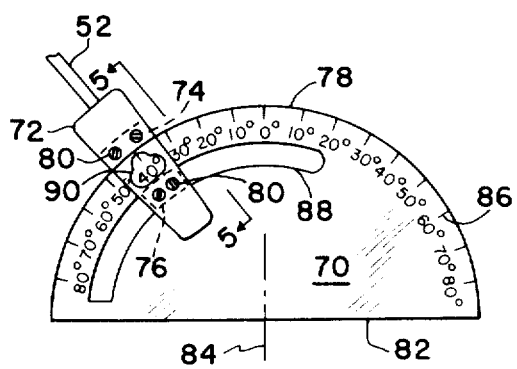
FIG. 4
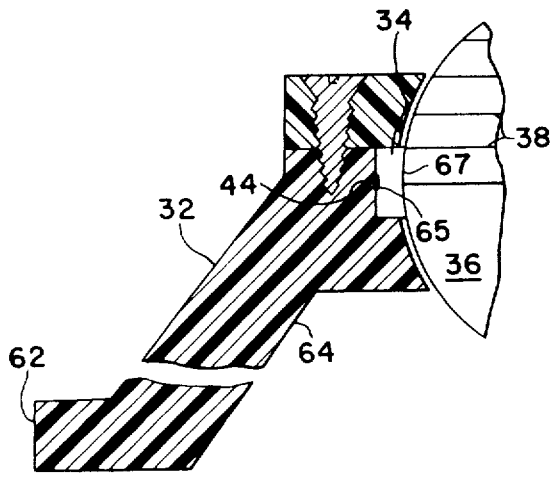
FIG. 6
FIG. 5
INVENTORS
HOWARD B. MILLER
GEORGE E. SWEET
BY
*J. McCoy*
*Howard J. Osborn*
ATTORNEYS

SPHERICAL MEASUREMENT DEVICE

The invention described herein was made by employees of the United States Government and may be manufactured and used by or for the Government for governmental purposes without payment of any royalties thereon or therefor.

This invention relates to measuring devices and, more particularly, to a device for measuring the angle and distance of a point within or without a spherical body from the surface of the body.

In order to calculate the radiant heat contributed to an interior surface by a balloon element it is necessary to know the total heat leaving the balloon element and a geometry factor that relates both elements. This geometry factor involves the knowledge of the distance between the elements and the true angles that a connecting line makes with both the balloon surface and the interior surface. The heat leaving the balloon surface element can easily be predicted; however, the related geometry can become complex if the interior surface is arbitrarily oriented. The geometrical data required can be obtained simply with a measuring apparatus that can simulate the relative position of the two surface elements and permit derivation of the necessary factors. Thus it is possible to measure the distance and angle from a point on which the sun shines on the outer surface to a point inside the sphere, regardless of the fact that these factors constantly change because of the rotation of the satellite about the earth in relation to the sun.

Various devices have been utilized in the past for spherical measurements and location of points on a spherical surface. However, none of these devices are capable of determining an interior surface location with respect to the spherical surface. For example, numerous navigation instruments utilize measurements around the outer surface of the sphere representing the earth. None of these devices relate to the location of the interior measurement and location of a surface within the spherical body itself.

Certain aspects of the prior art relate to features presented in the instant application. For example, it is known to utilize a scribed sphere for determining the angular location or the relationship between a sphere and another element and the utilization of a planar protractor for various purposes in relation to a sphere is known. However, none of the prior art devices arranges these various elements such that a spherical protractor is provided capable of locating a surface within the spherical body.

It is an object of the instant invention to provide a device for determining the distance and orientation of a surface with respect to spherical surface.

Another object of the instant invention is to provide a simple and easily operated device for obtaining the location of a surface within a spherical body.

Yet another object of this invention is to provide a device for a simple method of determining the radiant heat transfer from a balloon surface to an arbitrarily oriented element located within the balloon.

A still further object of the instant invention is to provide a device utilizing an elevation wheel mounted on an azimuth wheel with a spherical protractor mounted on said elevation wheel and having a measuring rod extending through the spherical protractor such that the angle and distance between an interior object and the spherical body can be readily obtained.

A more complete appreciation of the invention and many of the attendant advantages thereof will be readily apparent as the same become better understood by reference to the following description when considered in connection with the accompanying drawings wherein:

FIG. 1 is a side elevational view of the instant invention;

FIG. 2 is an end elevational view of the invention;

FIG. 3 is an enlarged view of the spherical protractor of the invention;

FIG. 4 is an enlarged view of a portion of the invention shown in FIG. 1;

FIG. 5 is an enlarged view taken on line 5 — 5 of FIG. 4, and

FIG. 6 is an enlarged view of a portion of the invention shown in FIG. 3.

Referring now to the drawings and more particularly to FIG. 1 wherein spherical protractor 10 is shown as including azimuth wheel 12 upon which is mounted, by suitable supports 14, elevation wheel 16. Elevation wheel 16 is mounted on supports 14 in such a manner as to permit the rotation of wheel 16 about a point in the center of the wheel. Wheel 16 is provided with indicia 18, designating the angular location of the indicia from a given reference plane such for example as 0° being vertical. As is more apparent from FIG. 2, elevation wheel 16 has rear support wheel 20 for providing stability to wheel 16 through supports 14 and additional support for plate 28 upon which is mounted spherical protractor 30.

Referring now to FIG. 3 wherein spherical protractor 30 is shown to include base 32 having bearing support 34 mounted therein for support of sphere 36. Sphere 36 utilizes concentric circles 38 which are scribed on the exterior surface thereof to designate the angular rotation of the sphere from 0° at the horizontal equator to 90° at, for example, north pole 40. Reference line 42 is scribed about the horizontal equator of sphere 36 and is utilized for an angular reading as will be more fully described hereinafter. Sphere 36 is either of hollow construction or provided with central opening 50 to permit measuring rod 52 to extend therethrough. Sphere 36 is provided with collars 54 surrounding the openings in the spherical surfaces for properly locating measuring rod 52 in sphere 36. In this regard it is to be noted that measuring rod 52 normally extends through north pole 40 and south pole 42.

Base 32 is generally provided with horizontal supports 62 having upright legs 64 and substantially horizontal portion 66 forming annular bearing support 34 for support of sphere 36 and proper location of concentric circles 38 with regard to reference line 44. It has been found to be advantageous to construct base 32 from a transparent material such as a clear plastic with reference line 44 scribed and painted a distinct color in groove 65 of bearing 34. It is to be noted that face 67 of bearing 34 provides the support, while permitting freedom for rotation, of sphere 36.

FIG. 4 shows an enlarged view of adjustable protractor 70 and its application to measuring rod 52. Protractor 70 is attached to rod 52 by a pair of plates 72 which are spaced from one another a sufficient distance to receive both rod 52, protractor 70, and teflon inserts 74 and 76. Insert 74 is located between the end of rod 52 and hemispherical surface 78 of protractor 70 and is held in position by nuts and bolts 80. Protractor 70 is of generally conventional construction having a flat surface 82 with indicia 84 designating the center thereof. Angular indicia 86 are properly located about hemispherical surface 78 of protractor 70. Side plates 72 extend beyond hemispherical slot 88 in protractor 70 and receive teflon insert 76 in slot 88 and between plates 72. Insert 76 is held in place by bolts 80. Plate 72 has opening 90 therein for reading the various angular designations of indicia.

OPERATION

Referring to FIG. 1 it is observed that telescoping measuring rod 52 extends through spherical protractor 30 such that surface 82 of adjustable protractor 70 is properly oriented on surface 100. Point 102 represents a balloon or other spherical surface element. It is merely necessary to reposition the elevation and azimuth wheels in order to determine other spherical element locations. Surface 100 represents the location of an interior surface element. Thus, rod 52 can extend between surface 100 and 102. The angle between the two surfaces is measured by protractor 70 and as rod 52 is properly extended between surface 100 and 102 it may be necessary to rotate horizontal azimuth wheel 12 or vertically rotate elevation wheel 16. And it may be necessary to rotate spherical protractor 30. That is, sphere 36 in which rod 52 is mounted may have to be rotated in order to properly align rod 52 with surfaces 100 and 102. The angular rotation of sphere 36 with respect to base 32 would be indicated by the tangency of one of the concentric circles 38 as compared to reference line 44. Rod 52 is located at 90° with respect to concentric circles 38 to be properly accommodated for simulating the connecting line between surfaces 100 and 102. When this line is simulated the true angle of the line with respect to the balloon element 102 is read directly from spherical protractor 30. Thus, it is seen that in the instant invention as described herein, rod 52 is used to both simulate the line connecting the surface and to measure the distance between these surfaces. Distances are read by reference markings engraved at specified locations along the length of rod 52, not shown.

Furthermore, it is to be realized that the above described operation of the instant invention may be modified such that elevation wheels 16 define the outer surface of a proposed spherical member to permit obtaining information concerning radiation between, for example, surface 28 and the surfaces 100 or 102 of objects within or without the sphere, respectively.

The instant spherical protractor concept and geometry simulation apparatus has general application. For example, the geometry simulation apparatus can be modified for measuring the angles and distances between a spherical model surface element and a mock heating element of an earth heat simulator. Use of the instant protractor is not limited to measurement on spherical surfaces but can be used wherever two surfaces are relatively close to each other, but not necessarily attached or located in the same plane. For instance, where the distance between the surface is so great that a measuring rod is impractical, a small telescope enclosed within the spherical protractor could be used for sighting the elevation of the second surface. Similarly, it would be possible to enclose a small light source and lense system within the spherical protractor if the distance between the two locations is sufficiently great to warrant such. Thus, the light beam would be pointed at a distant object and the true elevation angle read at the circular reference line. It is further understood to be possible to mount the elevation and azimuth wheels on a movable carriage that is capable of being rolled over a large curved or flat surface such as a layout table. It would then be possible to measure the angular relationships between arbitrarily oriented surfaces located either on the table or under the carriage.

Thus it is seen that the instant invention utilizes a novel instrument for measuring the distance and angular relationship between the surface of a sphere and an object located either within or outside the sphere. It is possible to rapidly and accurately obtain the angular relationship of such objects by reading the angle shown by the concentric line in juxtaposition to the reference line. This instrument also permits determination of the constantly changing angles at the spherical surface and linear interior or exterior object surface and the distance between such surfaces upon movement of the object.

What is claimed as new and desired to be secured by Letters Patent of the United States is:

1. A spherical protractor comprising: base means having a support bearing; a reference line on said bearing; a spherical member having concentric angle circles thereon mounted in said bearing; a measuring rod having indicia thereon extending through said spherical member, whereby the angular relationship and distance between two points can be accurately determined by direct reading of the angle circle in juxtaposition to said reference line and direct reading of indicia on said measuring rod.

2. A measuring device comprising: first angular measurement means for measuring angular displacement in a first plane; second angular measurement means for measuring angular displacement in a second plane perpendicular to said first plane; said second measurement means mounted to rotate about an axis passing through the center of said first measurement means; and spherical protractor means mounted in cooperation with said second measurement means, said spherical protractor means for measuring angular relationships between a point randomly located and a surface passing through the center of said spherical protractor means; whereby the angular relationship between the point and the surface measured by said spherical protractor may be related to a three-dimensional angular reference system formed by said first and second angular measurement means and may be rapidly and accurately determined.

3. The measuring device of claim 2 wherein said first measurement means comprises an azimuth wheel.

4. The measuring device of claim 2 wherein said second measurement means comprises an elevation wheel.

5. The measuring device of claim 2 wherein said first measurement means comprises an azimuth wheel; said second measurement means comprising an elevation wheel; and said spherical protractor means having linear measuring means extending therethrough for determining the distance between two angularly displaced points.

6. The measuring device of claim 2 wherein said spherical protractor means comprises: a base member having a support bearing; a reference line on said bearing; a spherical element supported by said support bearing; angular measurement indicia on said spherical element; and a measuring rod extending through said spherical element for linear measurement of the distance between two points, whereby the angular relationship and location of a point and a point on the surface can be easily and accurately determined when the surface is represented by said reference line, the point on the surface corresponds to the center of said spherical protractor and the other point is arbitrarily located.

7. The measuring device of claim 6 wherein said first measurement means comprises an azimuth wheel; said second measurement means comprising an elevation wheel.

8. The measuring device of claim 7 comprising adjustable protractor means mounted on the end of said measuring rod for measuring the angular relationship between said measuring rod and another surface containing the point arbitrarily located; whereby the angular relationship and distance between two surfaces which are randomly oriented may be determined rapidly and accurately at points anywhere on each surface.

* * * * *